No. 12,613. REISSUED FEB. 26, 1907.

G. W. SCOTT.

ADJUSTABLE STORM FRONT FOR VEHICLES.

APPLICATION FILED DEC. 3, 1906.

Witnesses

Chas. I. Milch

Clara Gallagher.

Inventor

George W. Scott

By Staley & Bowman

His Attorneys

THE NORRIS PETERS CO., WASHINGTON, D. C.

UNITED STATES PATENT OFFICE.

GEORGE W. SCOTT, OF TROY, OHIO.

ADJUSTABLE STORM-FRONT FOR VEHICLES.

No. 12,613. Specification of Reissued Letters Patent. Reissued Feb. 26, 1907.

Original No. 832,751, dated October 9, 1906. Application for reissue filed December 3, 1906. Serial No. 346,193.

*To all whom it may concern:*

Be it known that I, GEORGE W. SCOTT, a citizen of the United States, residing at Troy, in the county of Miami and State of Ohio, have invented certain new and useful Improvements in an Adjustable Storm-Front for Vehicles; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an adjustable storm-front for vehicles.

The objects of said invention are to produce a storm-front having improved parts, features, or elements of construction whereby it can be readily made adjustable either vertically or laterally or both vertically and laterally to the tops and bodies of various styles and classes of vehicles—such, for instance, as buggies, phaetons, automobiles, or, in fact, any class of vehicles having extension-tops; also, to produce a storm-front that can be quickly and easily connected to and removed from vehicles and that is simple in construction, light in weight, neat in appearance, and durable and strong, and one which can be manufactured at a minimum cost.

My invention consists, essentially, referring in general terms to the construction of my adjustable storm-front for vehicles, of the bow provided with a prop on each side thereof, the side arms, one of which is hinged to each of said props, the brace for strengthening the front by holding the ends of uprights of the bow apart and dividing off the space for the window at the top, and the adjustable supporting-rod which connects the uprights or ends of the bow at base, and other minor details of construction, and the very peculiar and novel construction, arrangement, and combination of these various parts, as will be more fully referred to hereinafter and set forth in the subjoined claims in accordance with the statutes in such cases made and provided therefor.

Figure 1:
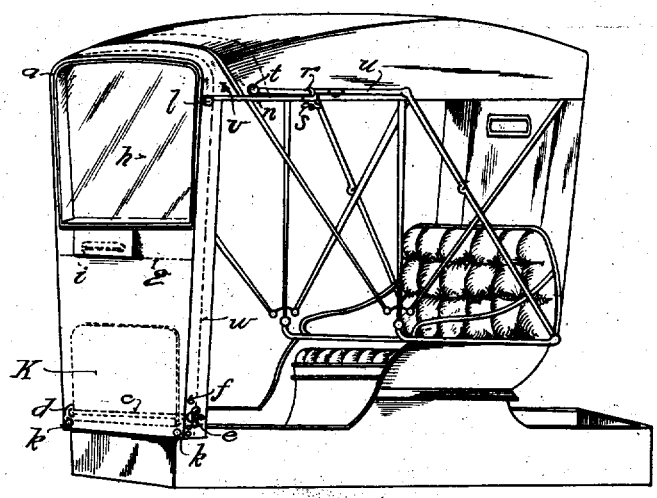
Figure 2:
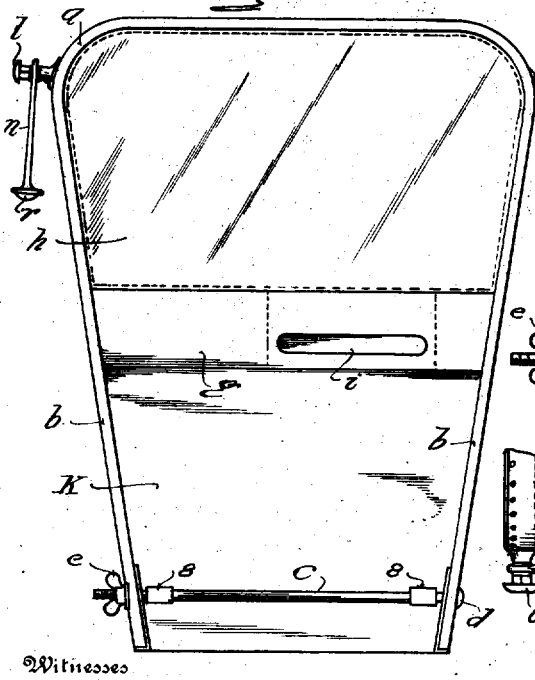
Figure 3:
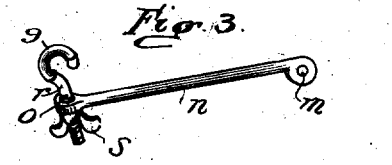
Figure 4:
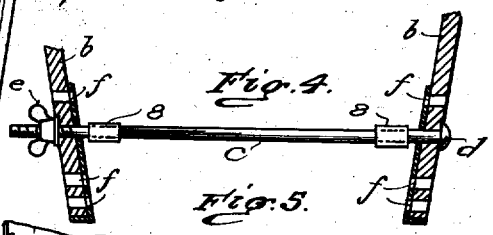
Figure 5:
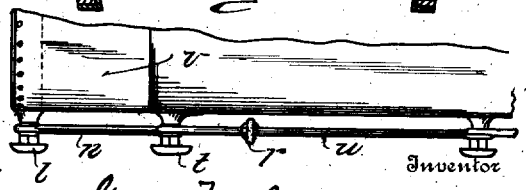

Referring to the accompanying drawings, illustrating my invention and constituting a formal part of this specification, and wherein the same letters and numerals of reference are used to indicate or point out the same parts wherever occurring throughout the several views, Figure 1 is a perspective view of a buggy top and body with my adjustable storm-front in position, so as to show the practical application of my invention, the curtains being shown as raised or open for the purpose of more clearly and fully showing said front. Fig. 2 is a rear view of said storm-front. Fig. 3 is a perspective view in detail of one of the side arms and the adjustable connecting-hook of same. Fig. 4 is a sectional view in detail, on a somewhat enlarged scale, of a broken-away portion of the ends or uprights of the bow and showing the adjustable connecting-rod for same; and Fig. 5 is a plan view of a broken-away portion of a storm-front and a buggy-top, showing one of the side arms and its adjustable hook connected to the top rail of said buggy-top.

In describing my said invention specifically, and referring in detail to the various mechanical features or elements of construction of my adjustable storm-front, as shown throughout the various views of the accompanying drawings and indicated or pointed out by means of the letters and numerals of reference, as aforesaid, said front having a frame consisting of a bow *a*, so formed or bent as to conform to the outline of the contour or shape of the buggy-top or front bow of the top of the vehicle, said bow *a* being constructed, preferably, out of wood—such as ash, oak, or hickory, or similar material, which is strong and tough, light in weight, and yet to a certain degree elastic or resilient, so that the ends, which when in position form the uprights *b*, may be drawn so as to closely bind and snugly and securely cling to the vehicle-body by means of connecting-rod *c*, provided at one end with a retaining-head *d* and at opposite end, which is screw-threaded, with a thumb-nut *e*, said uprights having a number of eyes or perforations *f*, adapted to receive said rod *c*, as shown, thereby making said front both vertically and laterally adjustable to the fronts of vehicle-tops of various heights and widths, also to the bodies of same, connecting-rod *c* being further provided near each end where it rests on the top edge of the body of the vehicle and against the foot of the "dash" with a cushion in form of a sleeve 8, of rubber or leather or similar suitable material, so as to prevent marring or scratching of the parts.

A brace or stay *g*, located approximately at the center of the length of the front, securely and firmly connects uprights *b*, the space above said brace being covered by a sheet of celluloid, parylin, or other similar suitable transparent material *h*, which in practice I connect to the top of said brace and the bow *a*, preferably by means of a strip of canvas or other strong textile material stitched to said transparent material, thus providing a clear full window which will never wrinkle or get out of shape. As illustrated by dotted and solid lines in Figs. 1 and 2, brace *g* is provided at *i* with a slot and a flap, which forms an ordinary rein-holder.

The space below brace *g* and on a line transversely with the ends of uprights *b* is provided with a covering K, of rubber drill, enamel leather, or of the same material as that covering the vehicle-top and forming a flap, between which and the uprights *b* and connecting-rods *c* rests the dash of the vehicle when the front is in proper position, as shown in Fig. 1, said covering and flap being held in position by a button secured to each of the uprights on each side of the front at *k*. At top of said front and on each side of bow *a*, near where it turns so as to form the uprights *b*, it is provided with a prop *l* of ordinary construction, and hinged to each of said props, by means of the eye *m* at one end thereof, is a side arm *n*, formed at the opposite end with a suitably-formed portion having an eye or perforation *o*, which receives and carries an adjusting-hook *r*, the screw-threaded end of which is provided with a thumb-nut *s*, (see Fig. 3,) so that when said front is in operative position said side arms will each when raised, as shown in Figs. 1 and 5, bear up underneath prop *t* on the buggy-top, to which the top rail *u* is hinged, while the adjusting-hook *r* will be placed or hooked over top rail *u* and firmly and adjustably engage same through the medium of thumb-nut *s*, thus causing said side arms to act as levers by binding against prop *t*, which will, in connection with the uprights and connecting-rod at base, as heretofore fully described, firmly and securely adjustably connect and support my storm-front to the extension-top of any and all classes of vehicles when raised. I prefer in practice to provide hook *r* with a rubber sleeve 9, similar to sleeve 8 of the connecting-rod.

My storm-front is of course provided with a small hood portion *v*, which projects from bow *a* over the vehicle-top, as shown by solid and dotted lines in Fig. 1, and which may be secured by straps in any ordinary manner; also, small side flaps *w*, connected to uprights *b*, to cover and protect side curtains mounted upon spring-rollers, which I prefer shall be of the "Hartshorn" make and not necessary for the purpose of this description to be here shown or referred to.

My improved front will not alone be found of superior advantage as a storm-front for buggies and carriages, as herein explained, but may be employed with equal advantage as a wind-shield for automobiles.

Having now fully and clearly explained the objects and purposes of my invention as set forth in connection with the construction of my device, what I claim is—

1. The combination, in a storm-front, of a frame, the lower portion of which consists of uprights of resilient material, adjustable means for connecting said uprights together whereby they may be made to approach or separate from each other to form an adjustable clamping device, substantially as specified.

2. In a storm-front, a frame, having an upper fixed or rigid portion and a lower resilient or adjustable portion, and a connecting-rod connecting the lower end of the frame to form a clamp, said connecting-rod being adjustable laterally as well as longitudinally to adjust said frame vertically and laterally, as described, and means for securing the top of said frame to the vehicle, substantially as specified.

3. In a storm-front consisting of a frame divided into two parts by a bar or brace, the lower part having means for attaching it to the vehicle-body, and hinged side arms secured to the upper part of said frame, each of said arms having clamping means to engage the vehicle-top prop or brace and to form a lever in connection therewith to secure said front firmly in position, substantially as specified.

4. The combination in an improved storm-front, of a frame, the upper portion of which is provided with a window, and the lower part with a covering of rubber drill or like material; the connecting-rod adapted to engage and adjust said frame vertically and laterally; and a side arm hinged to each of the props at top of said frame and adapted to adjustably engage the top rail of the vehicle-top; all substantially as described.

5. In an improved storm-front, the combination with the bow and uprights—constructed of resilient material; the brace for holding said uprights apart; the connecting-rod adapted to adjustably bind said uprights to the body of the vehicle by means of the eyes or perforations in said uprights; and the side arms hinged to said bow, and adapted to engage the top rail of the vehicle-top; all substantially as and for the purpose described.

6. The combination in a storm-front and wind-shield, for buggies, carriages and automobiles; of the wooden bow formed with resilient ends or uprights; the brace or stay connected to said uprights; the window of celluloid or transparent material; the connecting-rod adapted to bind said uprights to the body of the vehicle so as to support said front in an adjustable position vertically and laterally; the side arms hinged to said bow and adapted to act as levers by bearing up against the props on the vehicle-top, and adjustably engage the top rail of said vehicle-top; all substantially in the manner and for the purposes described.

GEORGE W. SCOTT.

Witnesses:

CHAS. I. WELCH,

CLARA GALLAGHER.